(12) United States Patent
Tanaka (10) Patent No.: US 10,551,764 B2
(45) Date of Patent: Feb. 4, 2020

(54) OPTICAL SCANNING APPARATUS AND IMAGE FORMING APPARATUS

(71) Applicant: CANON KABUSHIKI KAISHA, Tokyo (JP)

(72) Inventor: Yoshihiko Tanaka, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 15/589,338

(22) Filed: May 8, 2017

(65) Prior Publication Data

US 2017/0329253 A1 Nov. 16, 2017

(30) Foreign Application Priority Data

May 10, 2016 (JP) .................................. 2016-094478

(51) Int. Cl.
*G03G 15/043* (2006.01)

(52) U.S. Cl.
CPC .................................. *G03G 15/043* (2013.01)

(58) Field of Classification Search
None
See application file for complete search history.

(56) References Cited

U.S. PATENT DOCUMENTS

| 6,856,338 | B2 | 2/2005 | Takahashi et al. ........... 347/225 |
| 6,969,846 | B2 | 11/2005 | Tanaka et al. ................ 250/239 |
| 9,128,291 | B2 | 9/2015 | Nagatoshi et al. .. G02B 26/121 |
| 9,523,851 | B2 | 12/2016 | Nakamura et al. .. G02B 26/121 |
| 2006/0139442 | A1* | 6/2006 | Kurita .................. G02B 26/121 347/261 |
| 2014/0160217 | A1* | 6/2014 | Nagatoshi .......... G03G 21/1666 347/118 |
| 2015/0338768 | A1 | 11/2015 | Nagatoshi et al. .. G03G 15/043 |
| 2017/0075251 | A1 | 3/2017 | Yamaya et al. .............................. G03G 15/04036 |
| 2017/0142283 | A1 | 5/2017 | Tanaka et al. ......... H04N 1/113 |

FOREIGN PATENT DOCUMENTS

| JP | 2013-231904 | 11/2013 |
| JP | 2014-115575 | 6/2014 |

* cited by examiner

*Primary Examiner* — Roy Y Yi (74) *Attorney, Agent, or Firm* — Venable LLP (57) ABSTRACT

An optical scanning apparatus includes a deflector for deflecting a beam emitted from a light source, the deflector including a rotatable polygonal mirror for reflecting the beam, a motor for rotating the rotatable polygonal mirror, a substrate carrying the motor and provided with a circuit for driving the motor, and a magnetometric sensor carried on the substrate; an optical box accommodating the deflector. The substrate is provided with two holes for fastening the substrate to the optical box. The optical box is provided with two contact portion contacting the substrate in a state that the substrate is fastened to the optical box through the two holes. The magnetometric sensor is disposed at a position closer to a line m connecting the two holes than to a line n connecting two positions on the substrate where the two contact portions contact.

11 Claims, 6 Drawing Sheets

OPTICAL SCANNING APPARATUS AND IMAGE FORMING APPARATUS

FIELD OF THE INVENTION AND RELATED ART

The present invention relates to a scanning optical apparatus which has the function of forming an image on transfer medium (recording medium) such as sheet of paper, and which is employed by a laser printer and a copying machine, for example. It relates to also an image forming apparatus having the scanning optical apparatus.

A scanning optical apparatus employed by an image forming apparatus such as a laser printer has a deflecting device which has: a rotational polygonal mirror which changes in direction a beam of laser light projected from an light source while being modulated with image formation signals; a motor which drives the rotational polygonal mirror, and a circuit board which controls the motor.

The deflecting device is fixed to a casing (which hereafter may be referred to as "optical box") with the use of small screws or the like fixing means. There is disclosed in Japanese Laid-open Patent Application No. 2014-115575, a scanning optical apparatus structured so that the circuit board of its deflecting device is fixed to its optical box. In the case of this scanning optical apparatus, there is a possibility that if the circuit board of the deflecting device is fixed to the optical box with the use of only two small screws, the shaft of the deflecting device will tilt or fall down. Therefore, the optical box is provided with a pair of portions, in addition to the portions to which the screws are attached, for supporting the circuit board.

The circuit board of the deflecting device is fixed to the optical box with the use of small screws. Thus, as the circuit board of the deflecting device is placed in contact with the pair of circuit board supporting portions, the circuit board receives pressure from the circuit board supporting portions. Thus, the circuit board deforms. Consequently, the electrical components soldered to the deformed portions are subjected to a certain amount of stress. As the electrical components are subjected to stress, it is possible that they will fail to perform at a preset level. Thus, it is desired that they are subjected to as small an amount of stress as possible. If a Hall element is subjected to stress, it is possible that it will fail to output a preset amount of voltage which is proportional to a preset level of magnetic flux density. If a Hall element fails to output a preset amount of voltage which is proportional to a preset level of magnetic flux density, an offset amount of voltage adds to the output signal from the Hall element, which in turn causes the deflecting device to deviate in rectification timing, making it possible for the deflecting device to become erratic in the revolution of its rotational polygonal mirror.

SUMMARY OF THE INVENTION

Thus, the primary object of the present invention is to prevent the problem that it becomes impossible for the magnetometric sensor on a circuit board to perform at a preset level, in order to realize a scanning optical apparatus, the deflecting device of which does not become erratic in the revolution of its rotational polygonal mirror.

Further features of the present invention will become apparent from the following description of exemplary embodiments with reference to the attached drawings.

DESCRIPTION OF THE EMBODIMENTS

To begin with, an image forming apparatus equipped with a scanning optical device which is in accordance with the present invention is described with reference to appended drawings. By the way, in the following description of the preferred embodiment of the present invention, an image forming apparatus equipped with a scanning optical device which is in accordance with present invention is described first. Then, the scanning optical device of the image forming apparatus is described. Lastly, a deflecting device fixed to the circuit board of the scanning optical device is described. However, the measurements, materials, and shapes of the structural components of the apparatus, which are going to be described next, and the positional relationship among the components, are to be modified as necessary according to the structure of an apparatus to which the present invention is applied, and also, according to various conditions under which the apparatus is used. That is, the following embodiment of the present invention is not intended to limit the present invention in scope.

[Image Forming Apparatus]

Figure 6:
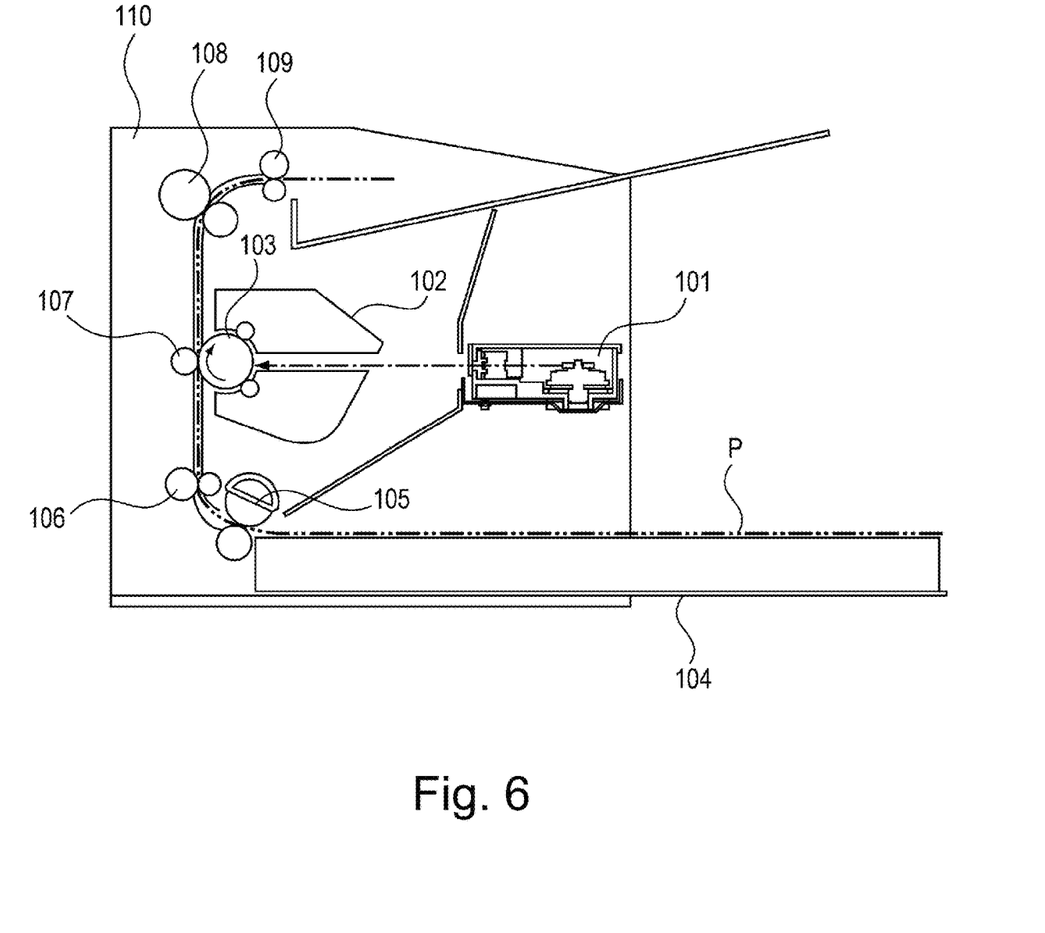
FIG. 6 is a schematic sectional view of the image forming apparatus in the preferred embodiment of the present invention.

Referring to FIG. 6, an image forming apparatus 110 (printer) which employs an electrophotographic recording method causes its scanning optical apparatus 101, as an exposing means, to emit a beam of laser light, while modulating the beam according to the obtained information about the image to be formed, in such a manner that the beam scans the peripheral surface of a photosensitive drum 103, as an image bearing member, disposed in a process cartridge 102. Consequently, a latent image is effected on the peripheral surface of the photosensitive drum 103. Then, the latent image is developed into a toner image, that is, a visible image formed of toner. By the way, the process cartridge 102 is a cartridge in which the photosensitive drum 103, and processing means, such as a charging means, a developing means, etc., for processing the photosensitive drum 103, are integrally disposed.

Meanwhile, multiple sheets P of recording medium loaded in layers on a recording medium supporting plate 104 are fed one by one into the main assembly of the image forming apparatus 110 by a feed roller 105 while being separated from the rest. Then, each sheet P of recording medium is conveyed further downstream by a pair of intermediary rollers 106 so that the aforementioned toner image formed on the photosensitive drum 103 is transferred onto the sheet P of recording medium by a transfer roller 107. After the transfer of the unfixed toner image onto the sheet P of recording medium, the sheet P is conveyed further downstream to a fixing device 108 which contains a heating member. Then, the sheet P is conveyed through the fixing device 108. While the sheet P is conveyed through the fixing device 108, the unfixed toner image on the sheet P is fixed to the sheet P. Thereafter, the sheet P is discharged out of the image forming apparatus 110 by a pair of discharge rollers 109.

In this embodiment, by the way, the aforementioned charging means and developing means, which are means for processing the photosensitive drum 103, are integrally disposed, along with the photosensitive drum 103, in the process cartridge 102. This embodiment, however, is not intended to limit the present invention in scope in terms of apparatus configuration. For example, the processing means may be separately disposed from the photosensitive drum 103.

[Scanning Optical Apparatus]

Figure 1:
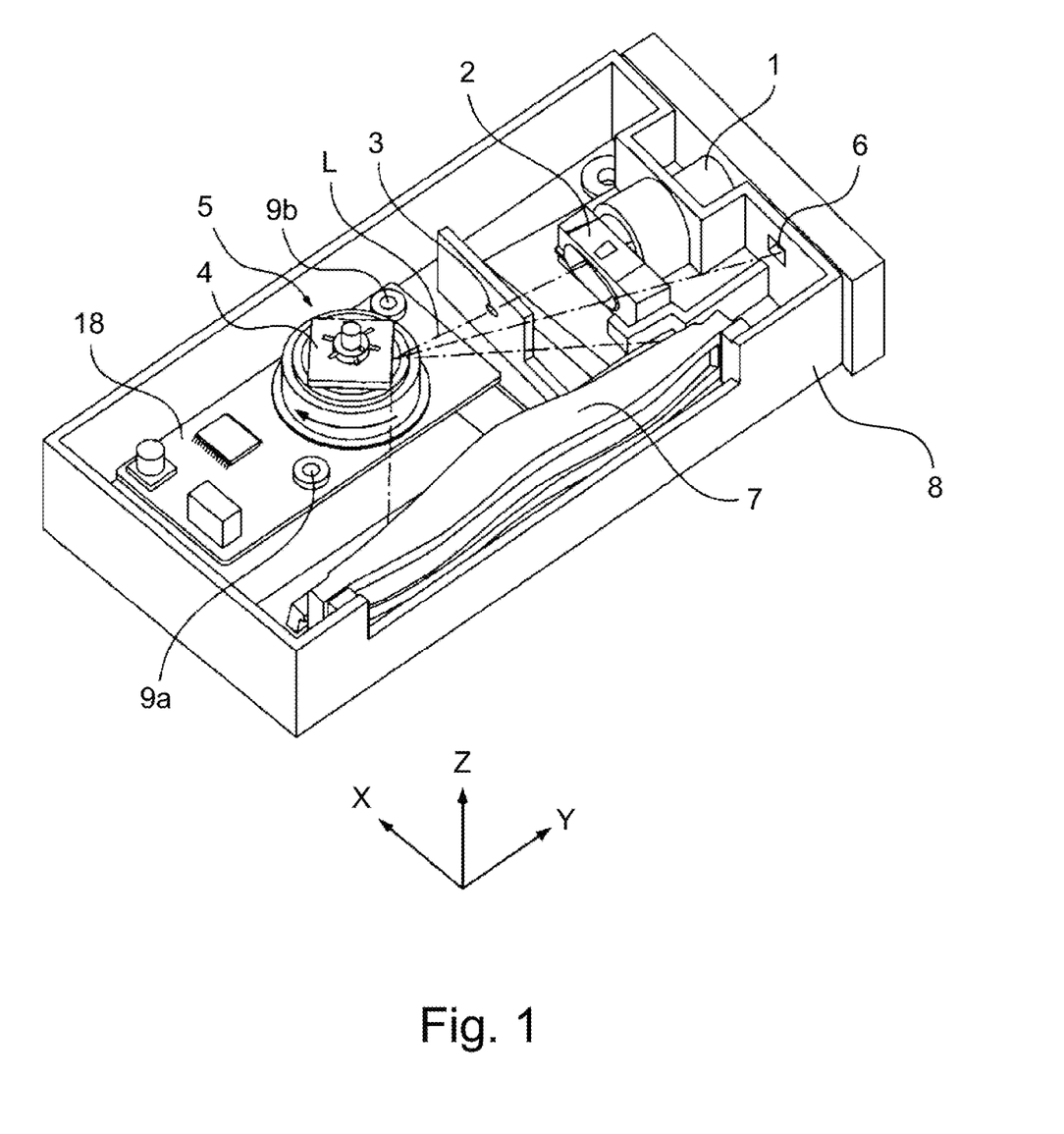
FIG. 1 is a perspective view of the scanning optical apparatus in one of the preferred embodiments of the present invention.

Next, referring to FIG. 1, the scanning optical apparatus is described. FIG. 1 is for describing the scanning optical apparatus in this embodiment of the present invention.

Referring to FIG. 1, a referential code 1 stands for a semiconductor laser unit which emits a beam of laser light. A referential code 2 stands for a compound anamorphic collimator lens, which is an integral combination of a beam detection lens (BD lens), and an anamorphic collimator lens which is an integral combination of a collimator lens and a cylindrical lens. A referential code 3 stands for an aperture; 4, a rotational polygonal mirror; 5, a deflecting device having the rotational polygonal mirror 4; 6, a light detection sensor for generating synchronization signals; 7, an f-θ lens (scanning lens); and 8 stands for an optical box (casing).

In the scanning optical apparatus structured as described above, in terms of the primary scan direction, a beam L of laser light emitted from the semiconductor laser unit 1 is changed into a roughly parallel or convergent beam of light by the compound anamorphic collimator lens 2, whereas in terms of the secondary scan direction, it is changed into a convergent beam of light. Then, the beam L of laser light is put through the aperture 3, being thereby controlled in width. Consequently, it forms such a focal line that extends in the primary scan direction on the reflective surface of the rotational polygonal mirror 4. Thus, as the rotational polygonal mirror 4 is rotated, this beam of laser light is deflected in a manner to scan an object. Then, the beam L enters the BD lens of the compound anamorphic collimator lens 2. After it passed through the BD lens, it enters the sensor 6, which generates a synchronization signal based on the beam of laser light which has just entered the sensor 6. The timing with which the synchronization signal was generated is used as the referential timing with which writing of a latent image in the primary scan direction is to be started. Next, the beam L of laser light enters the f-θ lens, the configuration of which is such that it focuses the beam L of laser light so that the beam L forms a spot on the peripheral surface of the photosensitive drum 103, and also, that the spot moves on the peripheral surface of the photosensitive drum 103 at a preset speed. In order to provide the f-θ lens with this kind of properties, an aspherical lens is used as the f-θ lens. After the beam L of laser beam passed through the f-θ lens, it comes out of the optical box 8 through the opening of the optical box 8, and forms such a spot that moves on the peripheral surface of the photosensitive drum 103 in a manner to scan the peripheral surface of the photosensitive drum 103.

[Deflecting Device]

Figure 2:
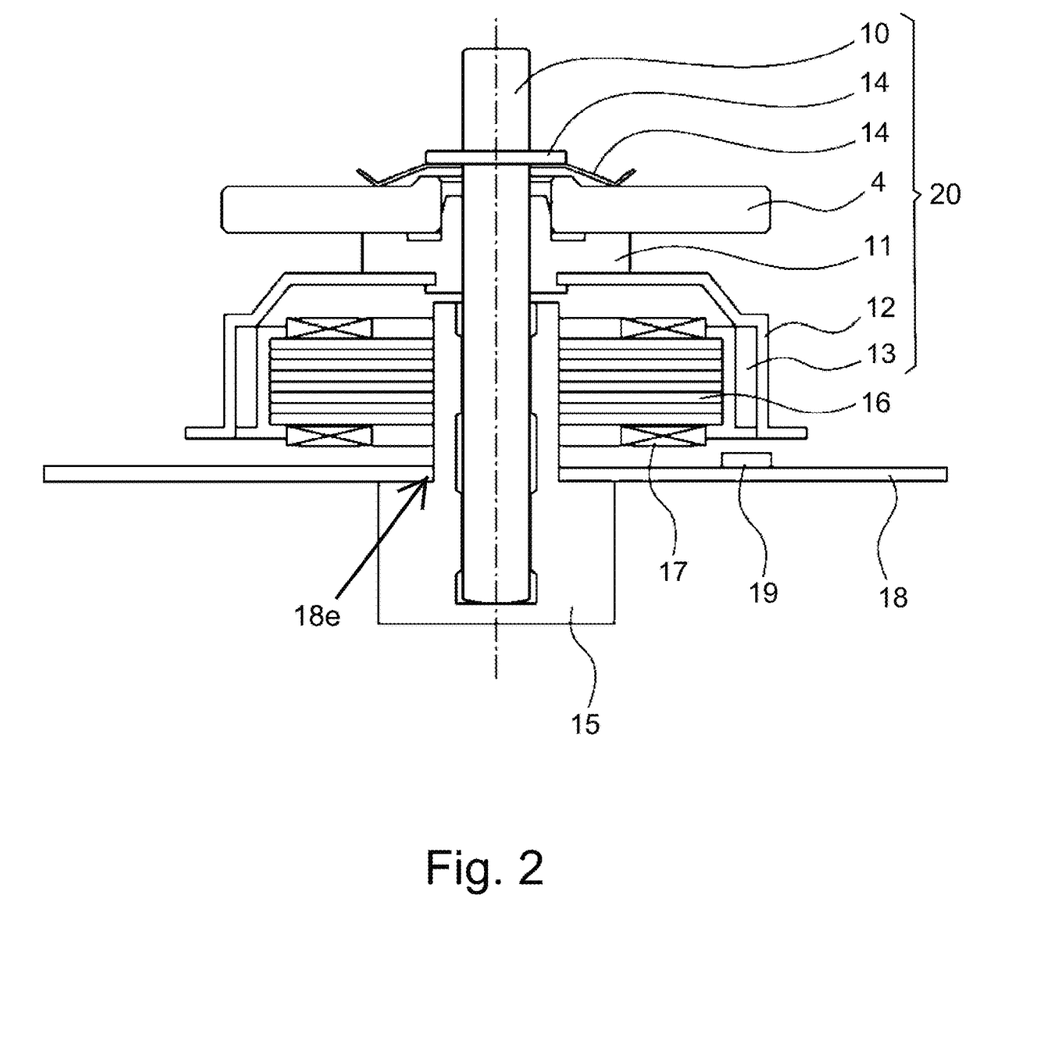
FIG. 2 is a sectional view of a part of the deflecting device of the scanning optical device shown in FIG. 1.

Next, referring to FIG. 2, the deflecting device in the above-described scanning optical apparatus is described. FIG. 2 is a partially sectional view of the deflecting device in this embodiment of the present invention.

Referring to FIG. 2, the rotor 20 (rotational driving portion) of the deflecting device 5 comprises: a rotational shaft 10, a boss 11, a frame 12, a magnet 13, the rotational polygonal mirror 4, and a mirror fixer 14. The rotational shaft 10 is in connection to the frame 12 through the boss 11. The magnet 13 is attached to the frame 12. By the way, the rotational polygonal mirror 4 is attached to the boss 11. That is, the rotational shaft 10, boss 11, frame 12, magnet 13, and rotational polygonal mirror 4 are integrally connected. Thus, as the rotational shaft 10 rotates, the rest rotate with the shaft 10.

Further, the circuit board 18 is fixed to a bearing 15, which rotatably supports the rotor 20, by being between the rotational shaft 10 and rotor 20. That is, the circuit board 18 rotatably supports the rotor 20.

It is also to the circuit board 18 that a stator core 16 having a stator coil 17 is attached. The rotor 20, stator core 16, stator coil 17, etc., make up a motor. It is on the circuit board 18 that electronic components such as an integrated circuit for driving the motor are mounted. In this embodiment, one or more Hall elements 19 (magnetometric sensor) are employed, which are soldered to the circuit board 18. In the following, a case where three Hall elements (which will be referred to as Hall elements 19a, 19b and 19c) are disposed as in this embodiment is described, although FIG. 1 shows only one Hall element 19. Further, the circuit board 18 is provided with two holes 18a and 18b into which two binding members, which will be described later, are inserted one for one. Further, the circuit board 18 is provided with a hole 18e, in which the bearing 15 is fitted.

As electric current is flowed through the stator coil 17 of the deflecting device structured as described above, electromagnetic force is induced between the stator coil 17 and magnet 13, whereby the rotor 20 is rotated around the rotational shaft 10 supported by the bearing 15. The Hall element 19 is a magnetometric sensor for deciding the timing (rectification timing) with which electric current is to be flowed through the stator coil 17. There are disposed three Hall elements (below magnet 13) in this embodiment so that their position corresponds to that of the magnet 13 in terms of the radius direction of the rotor 20. The Hall elements 19 detect the magnetic poles (N, S) of the magnet 13.

Figure 3:
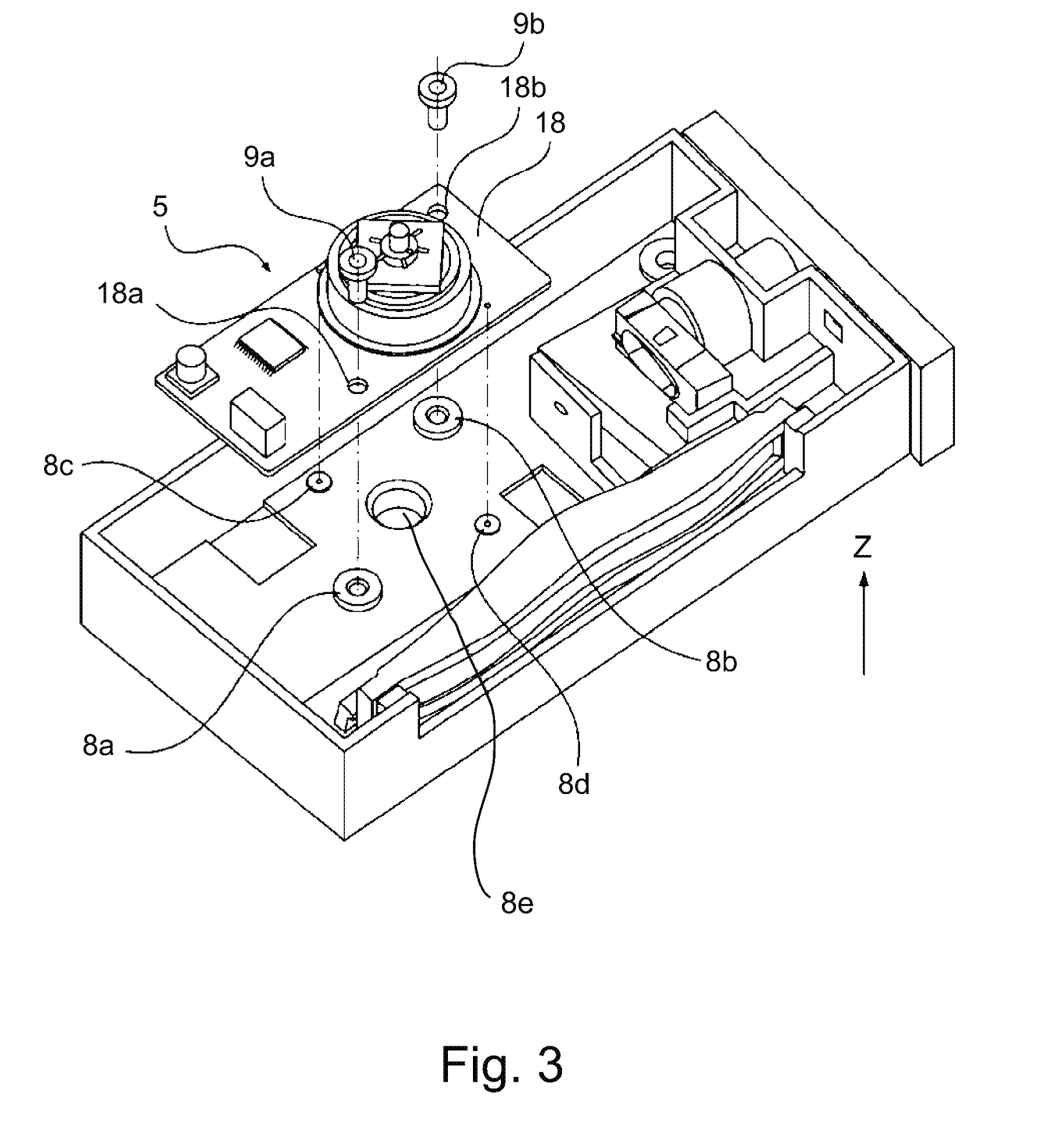
FIG. 3 is a partially exploded perspective view of the deflecting device in the embodiment of the present invention. It shows how the deflecting device is attached to the optical box.

Next, referring to FIG. 3, how the deflecting device 5 is fixed to the optical box 8 is described. Referring to FIG. 3, the deflecting device 5 is fixed to the two deflecting device seats 8a and 8b of the optical box 8, with the use of two small screws 9a and 9b (anchoring members). The two deflecting device seats 8a and 8b are positioned so that the inward surface of the seat 8a and that of the seat 8b coincide with the inward surface of the hole 18a and that of the hole 18b, respectively. The process for fixing the deflecting device 5 to the optical box 8 is as follows: First, the deflecting device 5 is disposed relative to the optical box 8 so that the holes 18a and 18b of the circuit board 18 align with the center hole of the deflecting device seat 8a of the optical box 8 and that of the deflecting device seat 8b of the optical box 8, respectively. Then, the small screw 9a is put through the hole 18a and is screwed into the center hole of the seat 8a, and the small screw 9b is put through the hole 18b and is screwed into the center hole of the seat 8b. Consequently, the circuit board 18 (that is, deflecting device 5) becomes fixed to the optical box 8 by the adjacencies of their holes 18a and 18b. By the way, the hole 8e of the optical box 8 is where the bearing 15 is inserted.

The optical box 8 is provided with two contacting portions 8c and 8d which come into contact with the circuit board 18 as the circuit board 18 is fixed to the optical box 8. The contacting portions 8c and 8d are integral parts of the optical box 8. The two contacting portions 8c and 8d come into contact with the portions of the circuit board 18, which are not pressed by the small screws 9a and 9b when the circuit board 18 is fixed to the developing device seats 8a and 8b of the optical box 8. In terms of the direction indicated by an arrow mark Z in FIG. 3, the circuit board contacting portions 8c and 8d are slightly greater in height than the deflecting device seats 8a and 8b. Therefore, when the deflecting device 5 (circuit board 18) is fixed to the optical box 8 with the use of the small screws, the circuit board 18 is pressed by the deflecting device contacting portions 8c and 8d in the direction indicated by the arrow mark Z.

Figure 4:
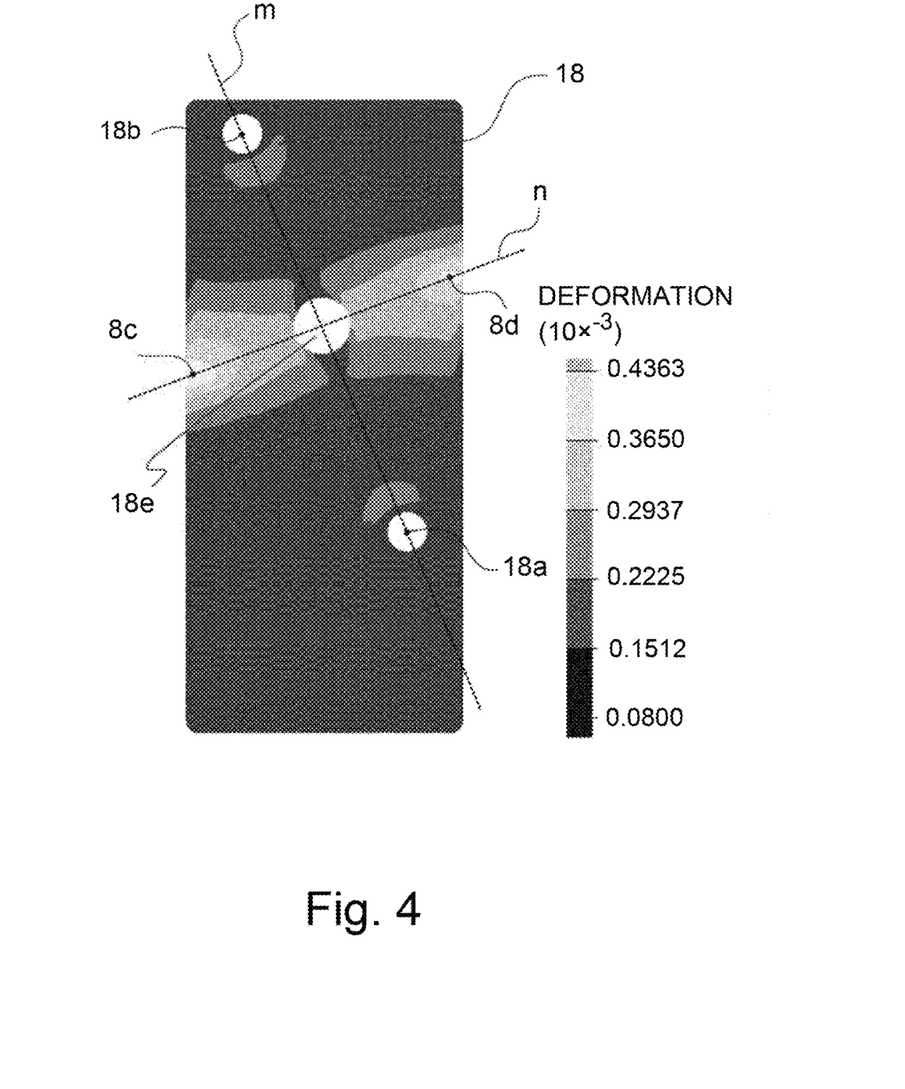
FIG. 4 is a stress plot of the results of the numerical simulation of the deformation of the substrate of the circuit board of the deflecting device.

FIG. 4 is a stress plot which shows the results of a numerical simulation, regarding the relationship between the amount of the deformation which was caused to the circuit board 18 by the pressure to which the circuit board 18 was subjected by the two circuit board contacting portion 8c and 8d, and the location of the deformation, when the deflecting device 5 is fixed to the optical box 8 with the use of small screws, the location of the deformation. In FIG. 4, in order to make it easier to see the state of the deformation, only the circuit board 18 is shown. In this embodiment, the numerical simulation conditions were as follows: The circuit board 18 was a piece of steel plate, which was 24 mm×0.9 mm in size, and the material for the optical box 8 was modified-polyphenylene-ether which contained filler. Further, two circuit board contacting portions 8c and 8d were made taller by 0.1 mm, in terms of the direction indicated by the arrow mark Z, than the two deflecting device seats 8a and 8b.

Referring to FIG. 4, an axis n is a straight line which coincides with the center of the deflecting device contacting portions 8c and the center of the contacting portion 8d. An axis m is a straight line which coincides with the center of the hole 18a for a small screw, and the center of the hole 18b for a small screw. The two axes are inter-sectional to each other; the straight line n is roughly perpendicular to the line m. Further, the straight lines m and n coincide with the center of the second hole 18e. The deformation of the circuit board 18 is largest across the areas of the circuit board 18, which correspond to the contacting portions 8c and 8d, and the immediate adjacencies of the areas.

Figure 5:
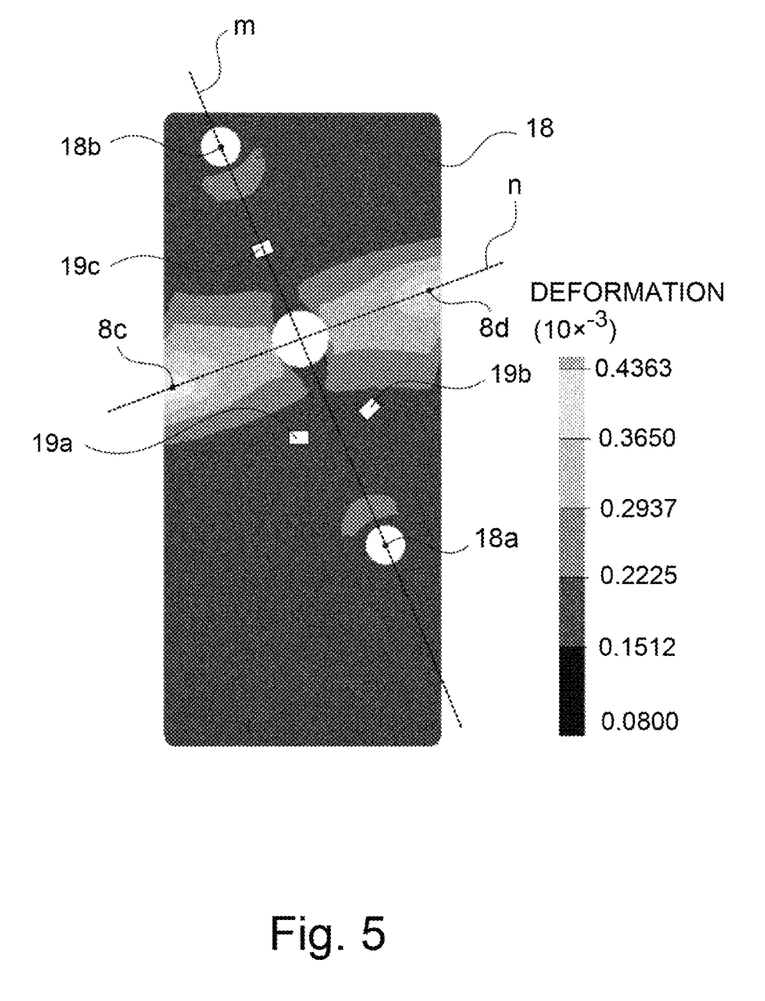
FIG. 5 is also a stress plot of the results of the numerical simulation of the deformation of the substrate of the circuit board of the deflecting device.

FIG. 5 is a combination of FIG. 4, which shows the results of the numerical simulation, and the position of each of the three Hall elements 19a, 19b and 19c. As described above, it is necessary for the Hall elements 19a, 19b and 19c to be disposed so that, in terms of the radius direction of the rotor 20, their position coincides with that of the magnet 13 of the circuit board 18 (directly below magnet 13). The phase of the magnet 13 in terms of its circumferential direction is determined by the relationship between the magnet 13 and stator core 16. The phase of the stator core 16 of the stator core 16 in terms of its circumferential direction is afforded a certain amount of latitude. Therefore, it is possible to dispose the Hall elements 19a, 19b and 19c so that they match the magnet 13 in terms of phase. Referring to FIG. 5, in order to minimize the amount of the stress to which the Hall elements 19a, 19b and 19c are subjected by the deformed circuit board 18, the Hall element 19a, 19b and 19c are disposed on the portions of the circuit board 18, which are small in the deformation. That is, the Hall elements 19a, 19b and 19c are disposed on the portions of the circuit board 18, which are closer to the straight line m than the straight line n. The portions of the circuit board 18, which are in the adjacencies of the straight line n are roughly three times greater in deformation than the portions of the circuit board 18, which are adjacent to the straight line m. Thus, if the Hall elements 19a, 19b and 19c are disposed on the portions of the circuit board 18, which are adjacent to the straight line n, the stress to which the Hall elements 19a, 19b and 19c are subjected will be roughly three times greater than when they are disposed on the portions of the circuit board 18, which are adjacent to the straight line m.

As described above, by disposing the Hall elements 19a, 19b and 19c on the portions of the circuit board 18, which are small in deformation, it is possible to minimize the amount of stress to which the Hall elements 19a, 19b and 19c are subjected. Therefore, it is possible to enable the Hall elements 19a, 19b and 19c to output a preset amount of voltage which is proportional to the magnetic flux density. Therefore, it is possible to prevent the deflecting device from deviating in rectification timing. Therefore, it is possible to prevent the occurrence of the problem that the deflecting device 5 becomes unsatisfactory in the rotation of its rotor.

By the way, in this embodiment, the deflecting device 5 is provided with three Hall elements. However, this embodiment is not intended to limit the present invention in scope in terms of the number of Hall elements. That is, the present invention is also applicable to a deflecting device having only one or two Hall elements disposed in the similar manner as described above, since the deflecting device 5 can be driven with the use of only one or two Hall elements.

Further, in this embodiment, the bearing portion of the deflecting device 5 was structured so that the rotational shaft 10 rotates. However, this embodiment is not intended to limit the present invention in scope in terms of the structure of a deflecting device. For example, the present invention is also applicable, with the same effects as those obtainable by this embodiment, to a deflecting device structured so that the shaft is fixed to the circuit board, and the portion of the deflecting device, to which the bearing portion is attached, rotates about the shaft.

Further, in this embodiment, the circuit board 18 was integral with a piece of steel plate. However, this embodiment is not intended to limit the present invention in scope in terms of the structure of a deflecting device. That is, the present invention is also applicable, with the same effects as those obtainable with this embodiment, to a deflecting device, the circuit board of which is not integral with a piece of steep plate.

According to the present invention, magnetometric sensors are disposed on the portions of the circuit board of a deflecting device, which are small in the amount of deformation. Therefore, it is possible to minimize a deflecting device in the amount of stress to which the magnetometric sensors are subjected. Therefore, it is possible to enable the magnetometric sensors to output a preset amount of voltage which is proportional to magnetic flux density. Therefore, it is possible to prevent the rectifying device from deviating in rectification timing. Therefore, it is possible to prevent the occurrence of the problem that a deflecting device incorrectly rotates its rotor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-094478 filed on May 10, 2016, which is hereby incorporated by reference herein in its entirety.

What is claimed is:

1. An optical scanning apparatus comprising:
    a deflecting device configured to deflect a beam emitted from a light source, said deflecting device including a rotatable polygonal mirror configured to reflect the beam, a motor configured to rotate said rotatable polygonal mirror, a substrate carrying said motor and provided with a circuit configured to drive said motor, and a magnetometric sensor carried on said substrate and configured to detect rotation of said motor; and
    an optical box accommodating said deflecting device,
    wherein said substrate is provided with two holes configured to fasten said substrate to said optical box using screws,
    wherein said optical box is provided with two contact portion contacting a surface of said substrate opposed to said two holes in a state that said substrate is fastened to said optical box through said two holes, and
    wherein said magnetometric sensor is disposed at such a position that a distance from said magnetometric sensor to a line m connecting said two holes is smaller than a distance from said magnetometric sensor to a line n connecting the two positions on said substrate where the said two contact portions contact the surface of said substrate, or is disposed on the line m.

2. The apparatus according to claim 1, wherein the line n is substantially perpendicular to line m.

3. The apparatus according to claim 1, wherein said substrate is provided with a second hole through which a bearing of said motor is penetrated, and the line m and the line n both pass through said second hole.

4. The apparatus according to claim 1, wherein said motor includes a rotor magnet configured to generate an electromagnetic force in interrelation with a stator coil to be supplied with current, and said magnetometric sensor is disposed at a position on said substrate corresponding to said rotor magnet.

5. The apparatus according to claim 1, wherein said contact portion has a height larger than a height of a fixing seat provided around each of said two holes said substrate to bear said substrate.

6. The image forming apparatus for forming an image on a recording material, said apparatus comprising:
    a scanning optical apparatus according to claim 1;
    an image bearing member configured to be scanned by the beam emitted from said scanning optical apparatus;
    a developing member for developing a latent image formed on said image bearing member; and
    a transfer member configured to transfer an image formed on said image bearing member onto the recording material.

7. A scanning optical apparatus comprising:
    a deflecting device configured to deflect a beam emitted from a light source, said deflecting device including a rotatable polygonal mirror configured to reflect the beam, a motor configured to rotate said rotatable polygonal mirror, a substrate carrying said motor and provided with a circuit configured to drive said motor, and a plurality of magnetometric sensors carried on said substrate and configured to detect rotation of said motor; and
    an optical box accommodating said deflecting device,
    wherein said substrate is provided with two holes configured to fasten said substrate to said optical box using screws,
    wherein said optical box is provided with two contact portion contacting a surface of said substrate opposed to said two holes in a state that said substrate is fastened to said optical box through said two holes, and
    wherein each of said magnetometric sensors is disposed at such a position that a distance from said magnetometric sensor to a line m connecting said two holes is smaller than a distance from said magnetometric sensor to a line n connecting the two positions on said substrate where the said two contact portions contact the surface of said substrate, or is disposed on the line m.

8. The apparatus according to claim 7, wherein the line n is substantially perpendicular to line m.

9. The apparatus according to claim 7, wherein said substrate is provided with a second hole through which a bearing of said motor is penetrated, and the line m and the line n both pass through said second hole.

10. The apparatus according to claim 7, wherein said contact portion has a height larger than a height of a fixing seat provided around each of said two holes said substrate to bear said substrate.

11. The image forming apparatus for forming an image on a recording material, said apparatus comprising:
    a scanning optical apparatus according to claim 7;
    an image bearing member configured to be scanned by the beam emitted from said scanning optical apparatus;
    a developing member for developing a latent image formed on said image bearing member; and
    a transfer member configured to transfer an image formed on said image bearing member onto the recording material.

* * * * *